United States Patent
Patzak et al.

(10) Patent No.: US 10,938,333 B2
(45) Date of Patent: Mar. 2, 2021

(54) CIRCUIT ARRANGEMENT AND ELECTRIC MACHINE

(71) Applicant: MOLABO GmbH, Ottobrunn (DE)

(72) Inventors: Adrian Patzak, Munich (DE); Florian Bachheibl, Munich (DE)

(73) Assignee: MOLABO GMBH, Ottobrunn (DE)

( * ) Notice: Subject to any disclaimer, the term of this patent is extended or adjusted under 35 U.S.C. 154(b) by 0 days.

(21) Appl. No.: 16/338,183

(22) PCT Filed: Sep. 28, 2017

(86) PCT No.: PCT/EP2017/074641
§ 371 (c)(1),
(2) Date: Mar. 29, 2019

(87) PCT Pub. No.: WO2018/060337
PCT Pub. Date: Apr. 5, 2018

(65) Prior Publication Data
US 2019/0245473 A1    Aug. 8, 2019

(30) Foreign Application Priority Data
Sep. 30, 2016 (DE) .......................... 102016118634.1

(51) Int. Cl.
*H02K 11/33* (2016.01)
*H02K 1/16* (2006.01)
(Continued)

(52) U.S. Cl.
CPC .............. *H02P 25/22* (2013.01); *H02K 1/16* (2013.01); *H02K 3/12* (2013.01); *H02K 3/48* (2013.01);
(Continued)

(58) Field of Classification Search
CPC . H02K 11/33; H02K 1/16; H02K 3/12; H02K 3/48
(Continued)

(56) References Cited

U.S. PATENT DOCUMENTS 5,142,468 A * 8/1992 Nerem ..................... H02M 7/48
307/14
2010/0071970 A1 3/2010 Welchko et al.
(Continued)

FOREIGN PATENT DOCUMENTS

DE    102010003020 A1    12/2010
DE    102011078841 A1    1/2013
(Continued)

OTHER PUBLICATIONS

IEEE , Title Impact of Stator Winding of Five phase Permanent Magnet Motor on Postfault Operations, Nicola et al. (2008) (Year: 2008).*
(Continued)

*Primary Examiner* — Jose A Gonzalez Quinones
(74) *Attorney, Agent, or Firm* — Morgan, Lewis & Bockius LLP

(57) ABSTRACT

A circuit arrangement (10) for controlling a stator winding (11) of a stator (12) of an electric machine (13) is provided. The stator winding (11) has at least four electrical phases ($\varphi$), which are designed to be supplied with a separate phase current ($I_n$), respectively. A modulation signal (M) is assigned to each electrical phase ($\varphi$) and the modulation signals (M) are out of phase with respect to one another so that the stator winding (11) is designed to generate a rotary field. At least two carrier signals (T) are provided for generating the phase currents ($I_n$), and the electrical phases ($\varphi$) are divided into at least two groups, each of which is assigned a carrier signal (T). The carrier signals (T) have a (Continued)

phase shift (θ) relative to one another. Furthermore, an electric machine (13) comprising a circuit arrangement (10) is provided.

10 Claims, 16 Drawing Sheets

(51) Int. Cl.
    *H02K 3/12*     (2006.01)
    *H02K 3/48*     (2006.01)
    *H02P 25/22*     (2006.01)
    *H02P 27/00*     (2006.01)
    *H02M 7/5387*     (2007.01)
    *B60L 50/51*     (2019.01)

(52) U.S. Cl.
    CPC .............. *H02K 11/33* (2016.01); *H02P 27/00* (2013.01); *B60L 50/51* (2019.02); *H02M 2007/53878* (2013.01)

(58) Field of Classification Search
    USPC ........................................ 310/68 R, 146, 150
    See application file for complete search history.

(56) References Cited

U.S. PATENT DOCUMENTS

| | | | |
|---|---|---|---|
| 2010/0072928 A1* | 3/2010 | Welchko | B60L 50/51 318/400.13 |
| 2014/0217948 A1 | 8/2014 | Magini et al. | |
| 2015/0340976 A1 | 11/2015 | Maiwald | |
| 2016/0141997 A1 | 5/2016 | Duguey et al. | |
| 2016/0173019 A1* | 6/2016 | Dajaku | H02P 27/04 318/498 |

FOREIGN PATENT DOCUMENTS

| | | |
|---|---|---|
| DE | 102014007632 B4 | 3/2016 |
| DE | 102014118356 A1 | 6/2016 |

OTHER PUBLICATIONS

IEEE, Title Six Phase fractional Slot per Pole per Phase Permanent Magnet Machines with Low Space Harmonics for Electrics Vehicle Applications Patel et al. (2014) (Year: 2014).*

Bianchi N. et al.: "Impact of Stator Winding of a Five-Phase Permanent-Magnet Motor on Postfault Operations" IEEE Transactions on industrial electronics, IEEE Service Center, Piscataway, NJ, USA, vol. 55, No. 5, May 2008, pp. 1978-1987.

Vipulkumar, P. et al.: "Six-Phase Fractional-Slot-per-Pole-per-Phase Permanent-Magnet Machines With Low Space Harmonics for Electric Vehicle Application" IEEE Transactions on industry applications, IEEE Service Center, Piscataway, NJ, US, vol. 50, No. 4, Jul./Aug. 2014, pp. 2554-2563.

Bachheibl, F. et al.: "High-Current, Low-Voltage Power Net" IEVC 2014.

Dajaku, G. et al.: "Low Costs and High Efficiency Asynchronous Machine with Stator Cage Winding" IEVC 2014.

Lazzari, M. et al., "Analytical and Numerical Computation of RMS Current Stress on the DC Link Capacitor in Multiphase Voltage Source PWM Inverters", EPE 2001, Graz, p. 1-p. 10.

Patzak, A. et al., "Design of a Multi-Phase Inverter for Low Voltage High Power Electric Vehicles", IEEE 2014, 7 pages.

Schulte, S. et al., "Analytical computation of the RMS current stress on the DC-link capacitor in DC-link PWM converter systems powering N-phase rotating field machines in PWM and square wave mode", International Journal of Applied Electromagnetics and Mechanics 19 (2004), pp. 497-502 IOS Press.

\* cited by examiner

CIRCUIT ARRANGEMENT AND ELECTRIC MACHINE

The present invention relates to a circuit arrangement for controlling a stator winding of a stator of an electric machine and to an electric machine.

Electric machines can be operated as a motor or as a generator. The electric machine can comprise a stator and a rotor that is mounted moveably in relation thereto. The stator can comprise an electrical winding, which is connected to a power system that can be multi-phase.

Electric machines can be used for example as motors in hybrid and battery electric vehicles. The problem exists with these vehicles that the battery voltages are very high and therefore the converters must also be designed for high voltages. Because of the high battery voltages, isolation and safety measures are necessary. If an electric motor is operated at a relatively low battery voltage, relatively high current intensities occur at the battery and in the rest of the vehicle electrical system. This means that the components of the vehicle electrical system must be designed for these high current intensities.

An object to be achieved consists in specifying a circuit arrangement for controlling a stator winding of a stator of an electric machine, which can be operated safely and is inexpensive to manufacture. A further object consists in specifying an electric machine, which can be operated safely and is inexpensive to manufacture.

According to at least one embodiment of the circuit arrangement for controlling a stator winding of a stator of an electric machine, the stator winding has at least four electrical phases, which are designed to each be supplied with a separate phase current. The stator winding can therefore be connected for example to power electronics, which supply each of the electrical phases with a separate phase current. The electrical phases can be formed for example by electrically conductive bars in slots in one or more stator laminations of the stator.

In the circuit arrangement a modulation signal is assigned to each electrical phase and the modulation signals are out of phase with respect to one another, so that the stator winding is designed to generate a rotary field. The modulation signals can be sinusoidal, for example. As a result of the phase shift of the modulation signals, a number of magnetic poles are generated in the stator during operation of the electric machine, which rotate along the circumference of an air gap between a stator and a rotor of the electric machine. If a rotor of the electric machine can interact with the number of pole pairs of the stator, the rotor can be driven by the rotary field.

At least two carrier signals are provided for generating the phase currents. The carrier signals can have the shape of a triangular signal or a sawtooth signal. The phase currents here can be generated by pulse width modulation with sine-triangle comparison.

The electrical phases here are divided into at least two groups, each of which is assigned a carrier signal, and the carrier signals have a phase offset relative to one another. If the electrical phases are divided into two groups, for example, the phase offset between the carrier signals can be 180 degrees.

If an electric machine is operated with a low battery voltage, for example less than 60 volts, very high battery currents and very high currents in the vehicle electrical system can occur. It is therefore advantageous to keep the paths between the battery and the power electronics short. Particularly high currents can occur in a DC link of the power electronics, where a dedicated half bridge is assigned to each electrical phase for generating the phase currents. The current occurring at a central intermediate circuit capacitor can be assumed to be the AC part of the superimposed phase currents. The root mean square (RMS) value IC of the current at the intermediate circuit capacitor depends on the time curve of the current iC, as shown in Equation 1:

$$I_C = \sqrt{\frac{1}{T}\int_0^T i_C(t)^2 dt}, \quad (1)$$

wherein an average is taken over a time period T.

If the phase offset between the carrier signals is 0, the phase currents at the intermediate circuit capacitor superimpose without a phase offset, which can lead to high amplitudes of the current at the intermediate circuit capacitor. By means of the phase offset of the different carrier signals, however, the RMS value of the current at the intermediate circuit capacitor can be reduced. By providing at least two carrier signals, the half bridges in the DC link can be controlled with a shift relative to one another. Not all the phase currents are therefore at a maximum at the same time but they have a time shift relative to one another.

However, a reduction of the current at the intermediate circuit capacitor can only be achieved if the stator winding has more than three, this means at least four, electrical phases. These can then be controlled by at least two carrier signals. If the maximum current occurring at the intermediate circuit capacitor is reduced, the intermediate circuit capacitor itself can also be made smaller. With this type of control, therefore, the circuit arrangement can be operated more safely since only low voltages occur, and it is inexpensive to produce since the intermediate circuit capacitor can be smaller in design.

According to at least one embodiment of the circuit arrangement for controlling a stator winding of a stator of an electric machine, the stator winding has at least four electrical phases, which are designed to be supplied with a separate phase current, respectively. The circuit arrangement comprises a means of assigning a modulation signal to each electrical phase and of phase-shifting the modulation signals relative to one another such that the stator winding is designed to generate a rotary field. The circuit arrangement further comprises a means for generating at least two carrier signals for generating the phase currents. The electrical phases here are divided into at least two groups, each of which is assigned a carrier signal, and the carrier signals have a phase offset relative to one another.

According to at least one embodiment of the circuit arrangement, the modulation signals are shifted by $$\frac{360}{N} * p$$

degrees relative to one another, wherein N denotes the number of electrical phases and p is a natural number. Thus, at least two poles can be generated in the stator during operation of the electric machine. The phase currents in the electrical winding generate a rotary field, which is variable with time, so that a torque can be generated in a rotor of the electric machine if this interacts with the number of pole pairs of the stator. If p is the number of pole pairs of the stator, rotary fields with a number of pole pairs greater than 1 can also be generated in the stator.

According to at least one embodiment of the circuit arrangement, the frequency of the carrier signal is greater than the frequency of the modulation signal. Preferably, the frequency of the carrier signal is much greater than the frequency of the modulation signal.

According to at least one embodiment of the circuit arrangement, the respective phase currents are generated by pulse width modulation. The phase currents can be generated for example by pulse width modulation with sine-triangle comparison. It is also possible that the carrier signal has the shape of a sawtooth signal.

According to at least one embodiment of the circuit arrangement, no voltage greater than 60 volts occurs during operation of the circuit arrangement. Thus, the electric machine can be operated in the safety extra-low voltage range. This means that fewer isolation and safety measures are necessary. Thus, cheaper production is possible together with simpler maintenance and repairs.

According to at least one embodiment of the circuit arrangement, the circuit arrangement is designed to be used in hybrid or battery electric vehicles. The circuit arrangement can also be used in aircraft or ships with hybrid or battery electric drives.

According to at least one embodiment of the circuit arrangement, the stator winding is formed by at least four electrically conductive bars which are each located in a slot in the stator, each bar forming an electrical phase. The electrically conductive bars can be divided into sub-bars or can comprise multiple bars and can be made of for example copper or aluminum. The stator of the electric machine therefore comprises at least four slots, in each of which an electrically conductive bar is located. The stator can comprise a laminated stator core, into which the slots are formed. Preferably, the stator comprises a plurality of slots. By means of the separate control of the electrically conductive bars it is possible to establish different numbers of pole pairs in the stator. The number of pole pairs can therefore also be adjusted during operation of the electric machine. Compared to other electrical windings for a stator it is possible in this case to set a high number of electrical phases. Thus, it is advantageously possible to generate the phase currents by at least two carrier signals that have a phase offset relative to one another. Thus, the maximum current occurring at the intermediate circuit capacitor can be reduced.

According to at least one embodiment of the circuit arrangement, the at least two groups of electrical phases each comprise the same number of electrical phases. A number of electrical phases of 15 can therefore be divided for example into three groups with five phases each or into five groups with three electrical phases each.

According to at least one embodiment of the circuit arrangement, the at least two groups of electrical phases each comprise different numbers of electrical phases. This division of the electrical phases can be advantageous in particular if the number of electrical phases is a prime number.

The circuit arrangement described here and the electric machine will be explained in more detail below in conjunction with exemplary embodiments and the associated figures.

Figure 4A:
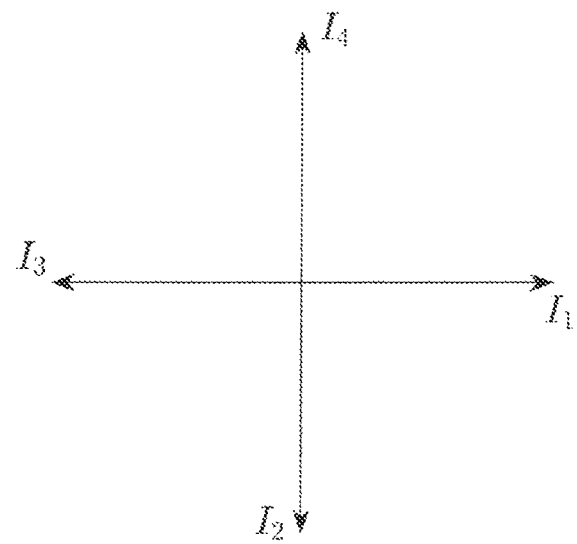
Figure 4B:
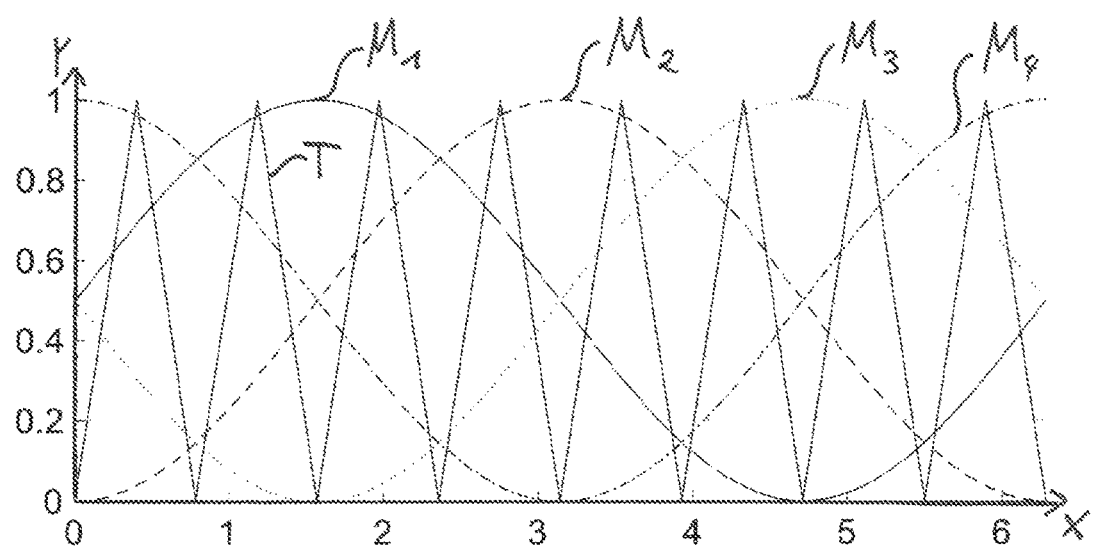

With FIGS. 4A and 4B the generation of the phase currents with one carrier signal is illustrated.

Figure 5A:
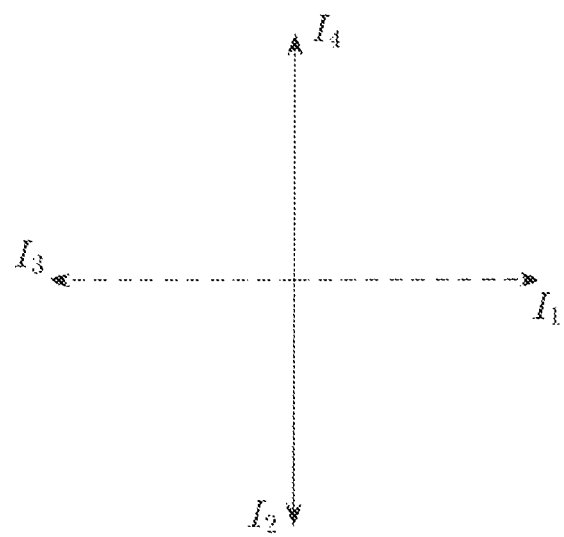
Figure 5B:
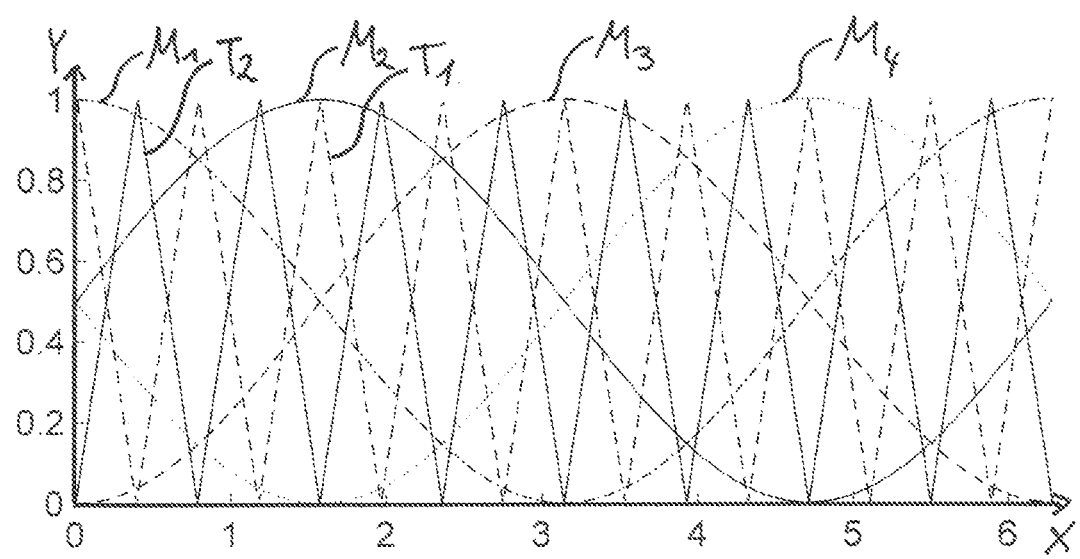

With FIGS. 5A and 5B the generation of the phase currents with two carrier signals is illustrated.

Figure 6A:
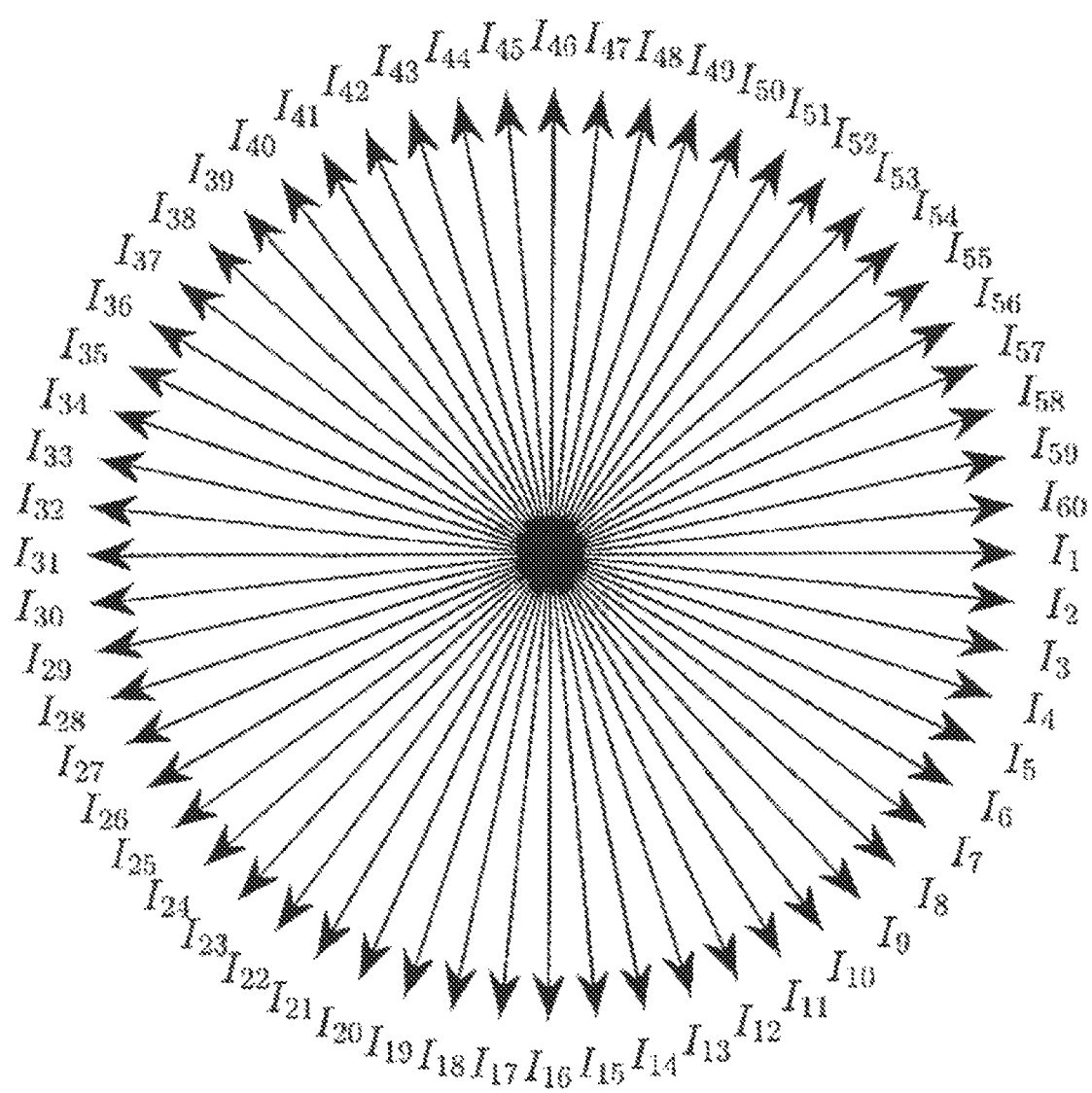
Figure 6B:
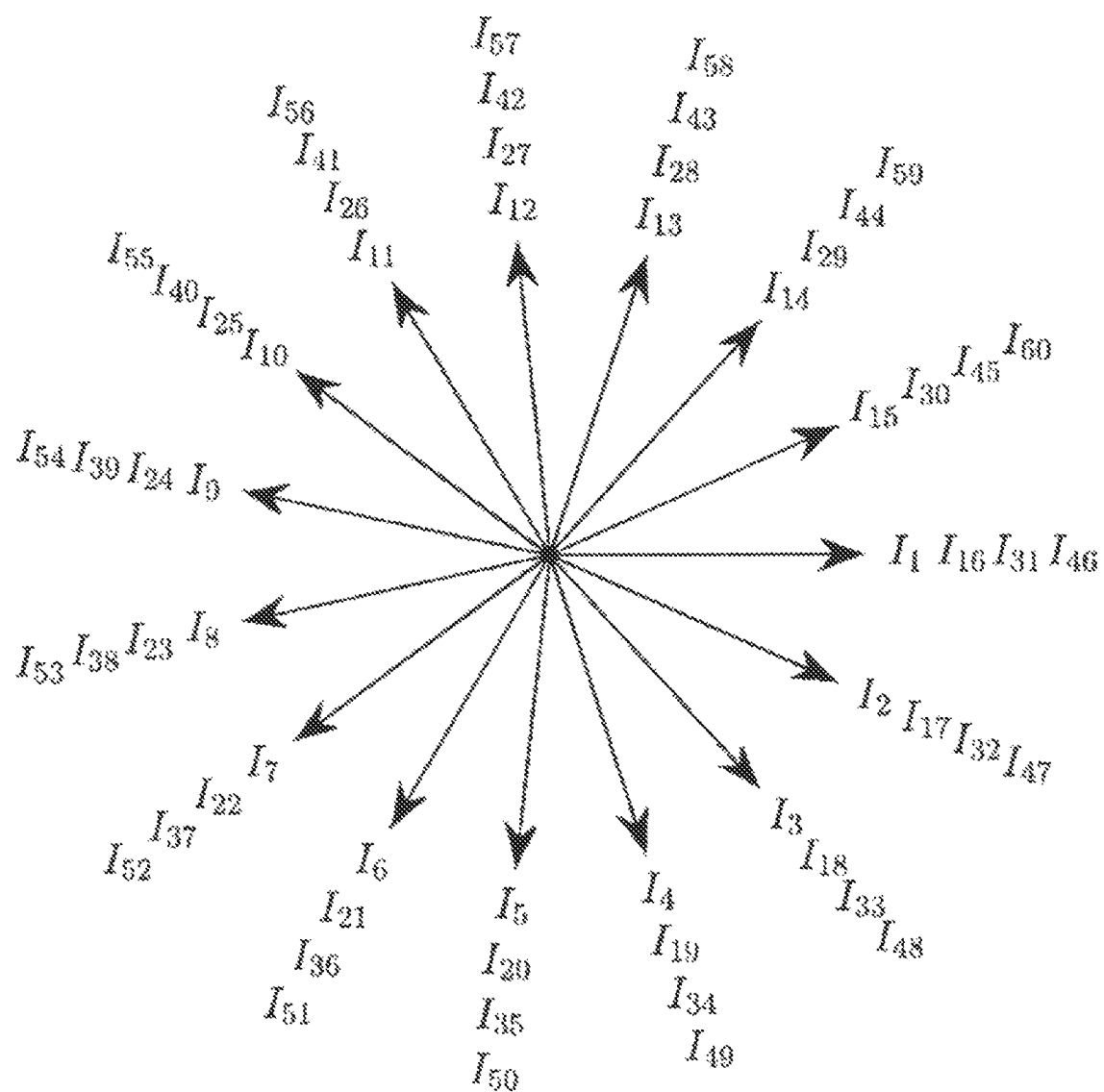

FIGS. 6A and 6B show qualitative current phasors for 60 stator bars.

Figure 7:
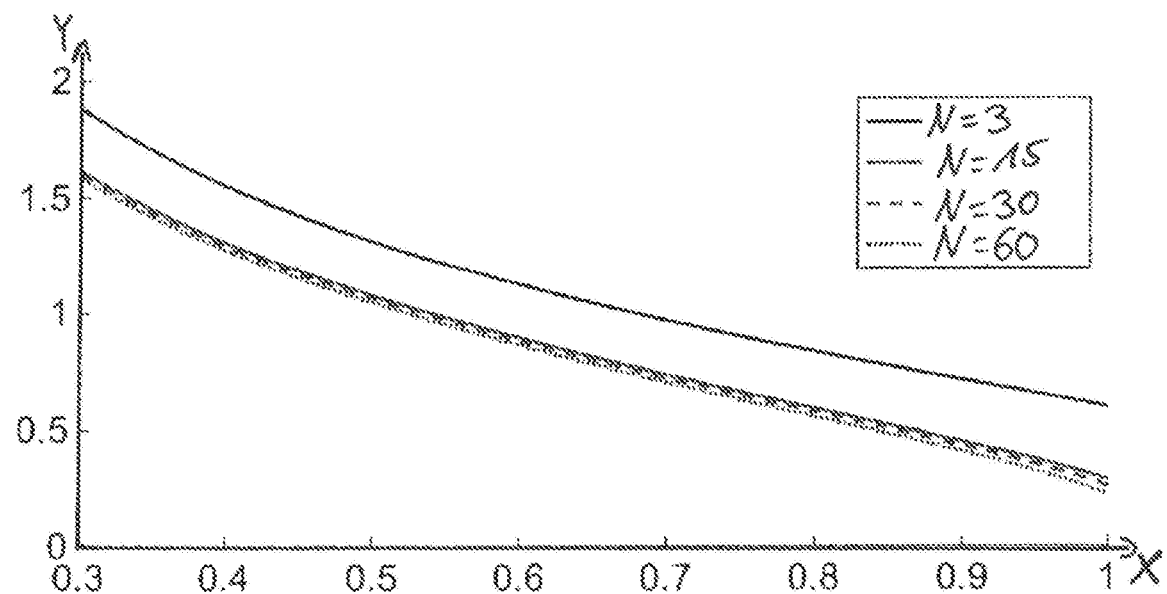
Figure 8:
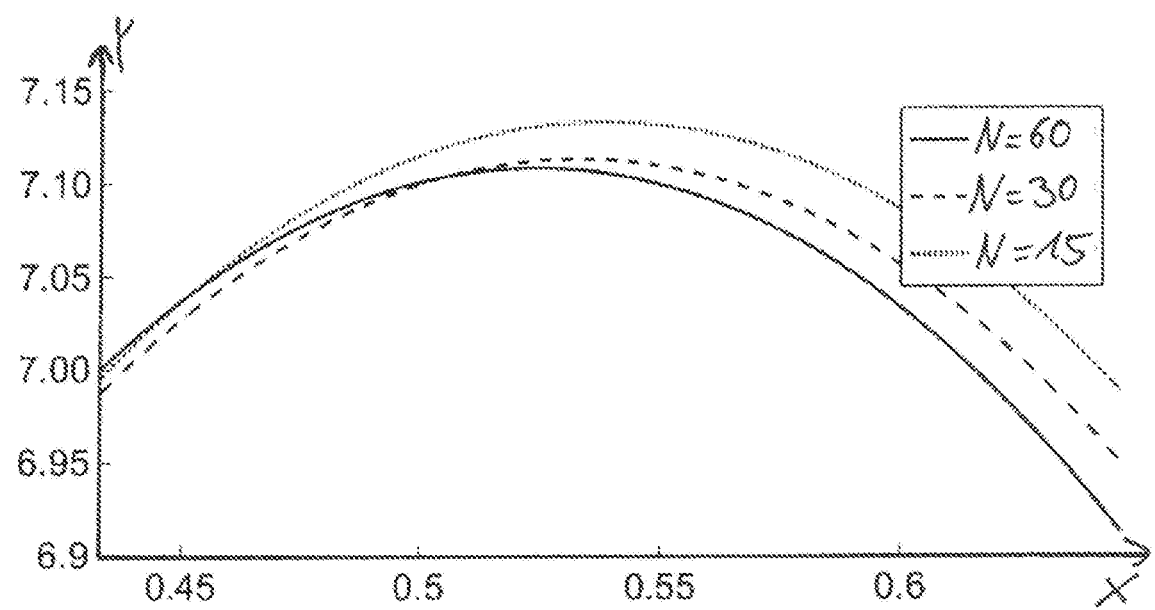

FIGS. 7 and 8 show analytical calculations of the current at the intermediate circuit capacitor.

Figure 9:
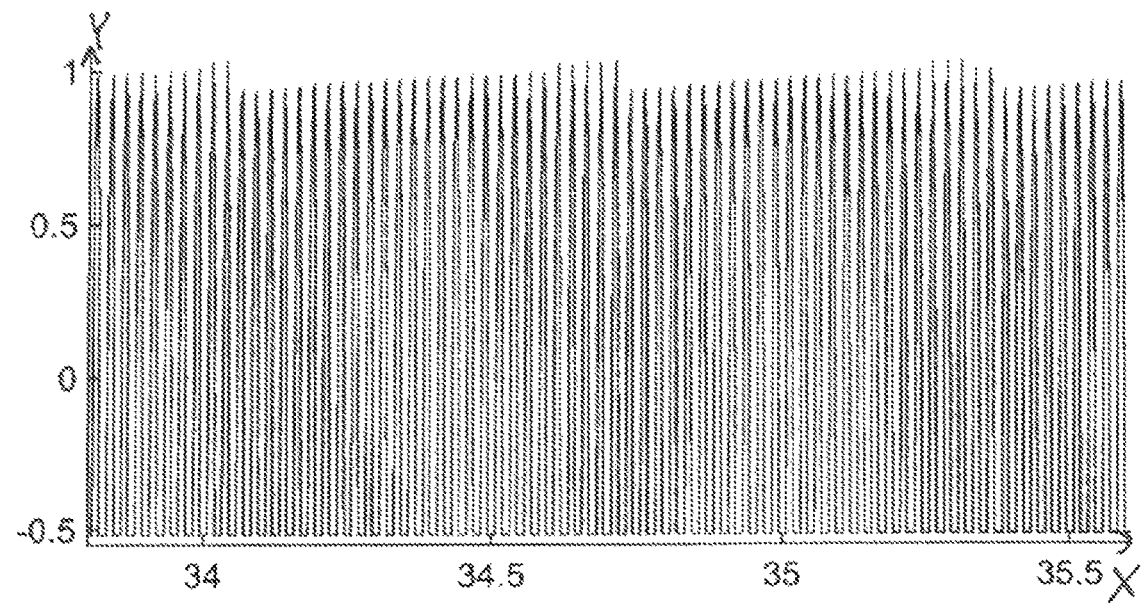

FIG. 9 shows a numerical calculation of the current at the intermediate circuit capacitor.

Figure 10:
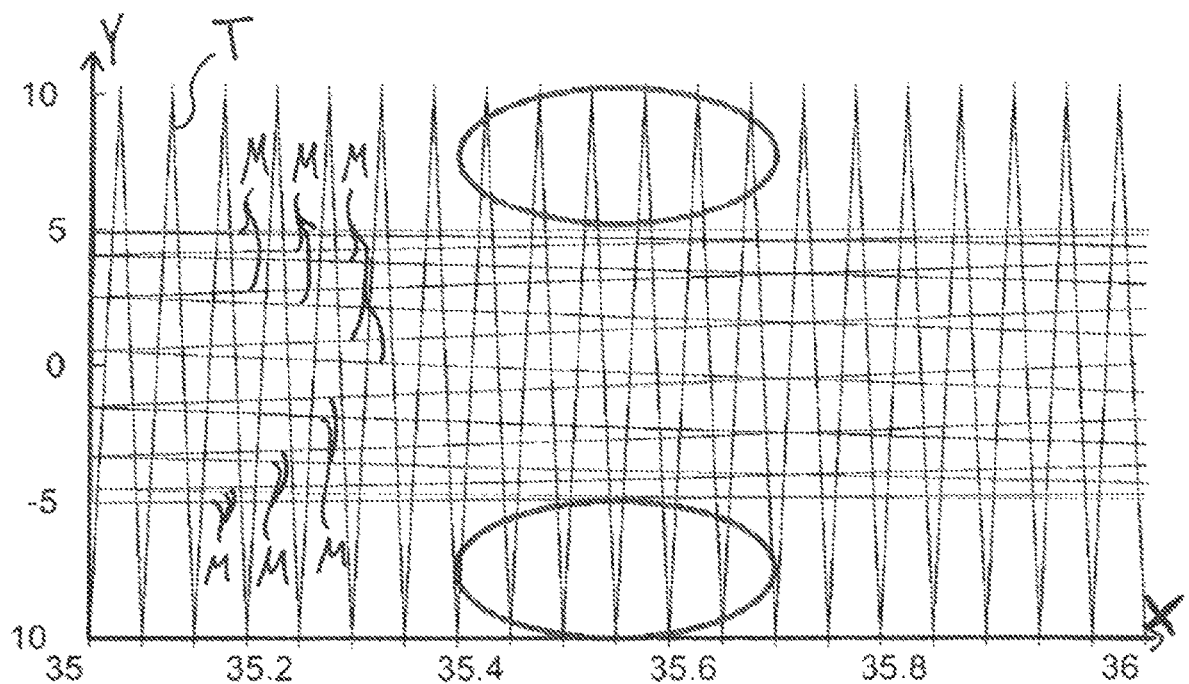

FIG. 10 shows multiple modulation signals and a carrier signal.

Figure 11:
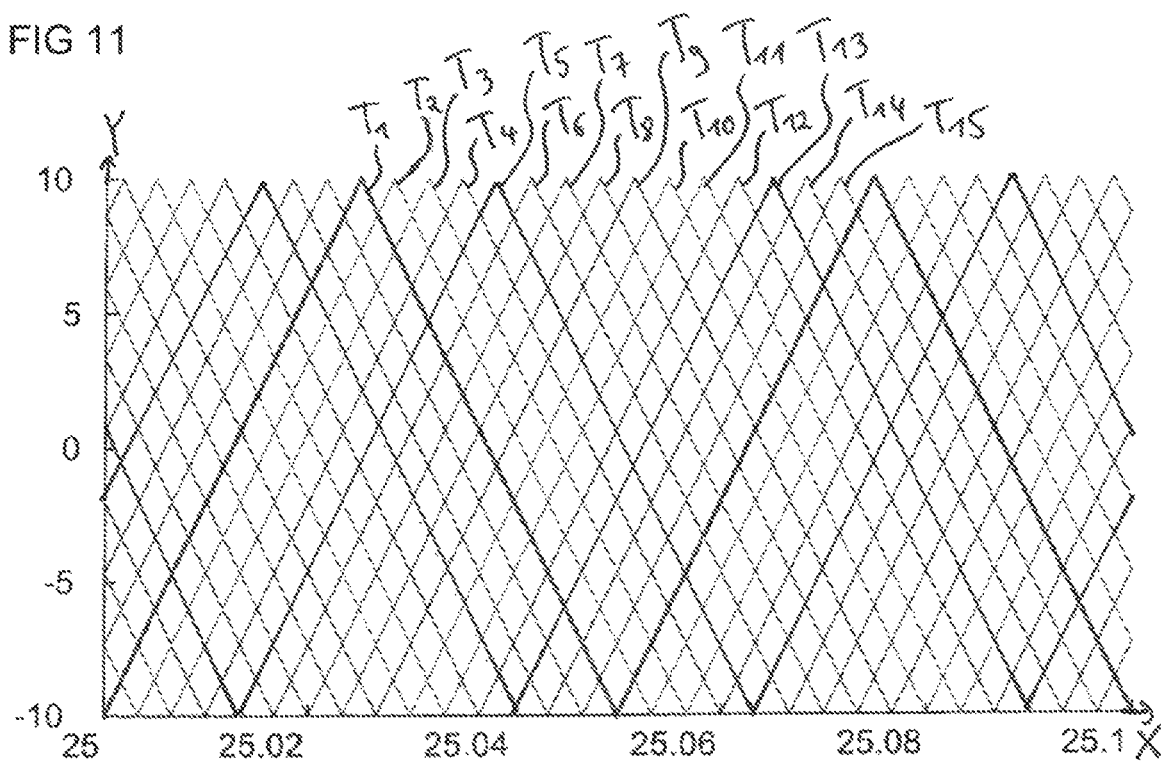

FIG. 11 shows 15 carrier signals shifted relative to one another.

Figure 12:
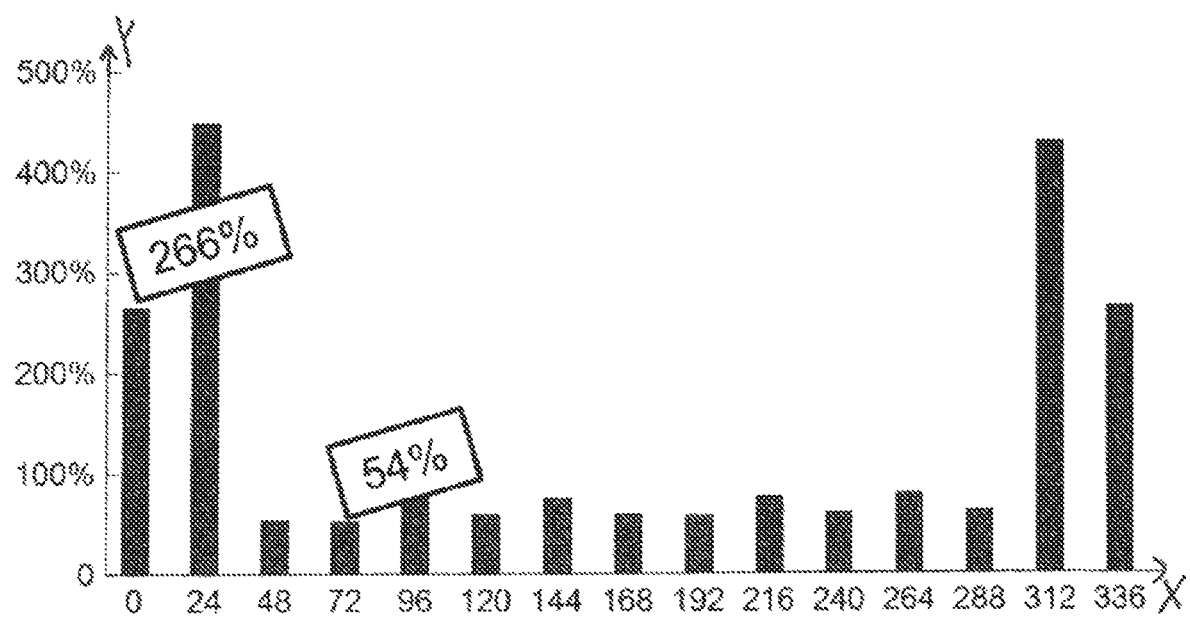

FIG. 12 shows the current at the intermediate circuit capacitor for different phase shifts of the carrier signals.

Figure 13A:
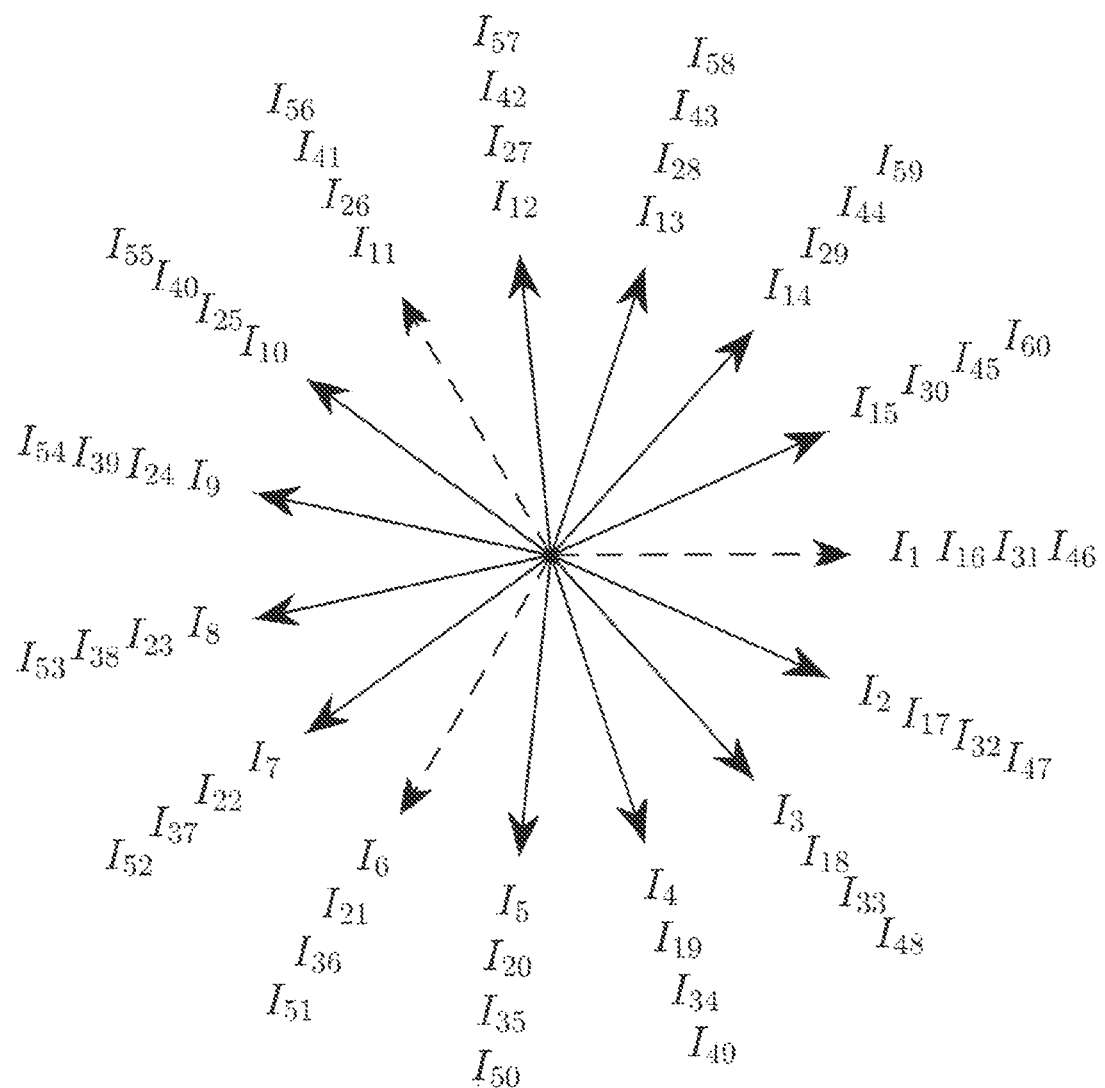
Figure 13B:
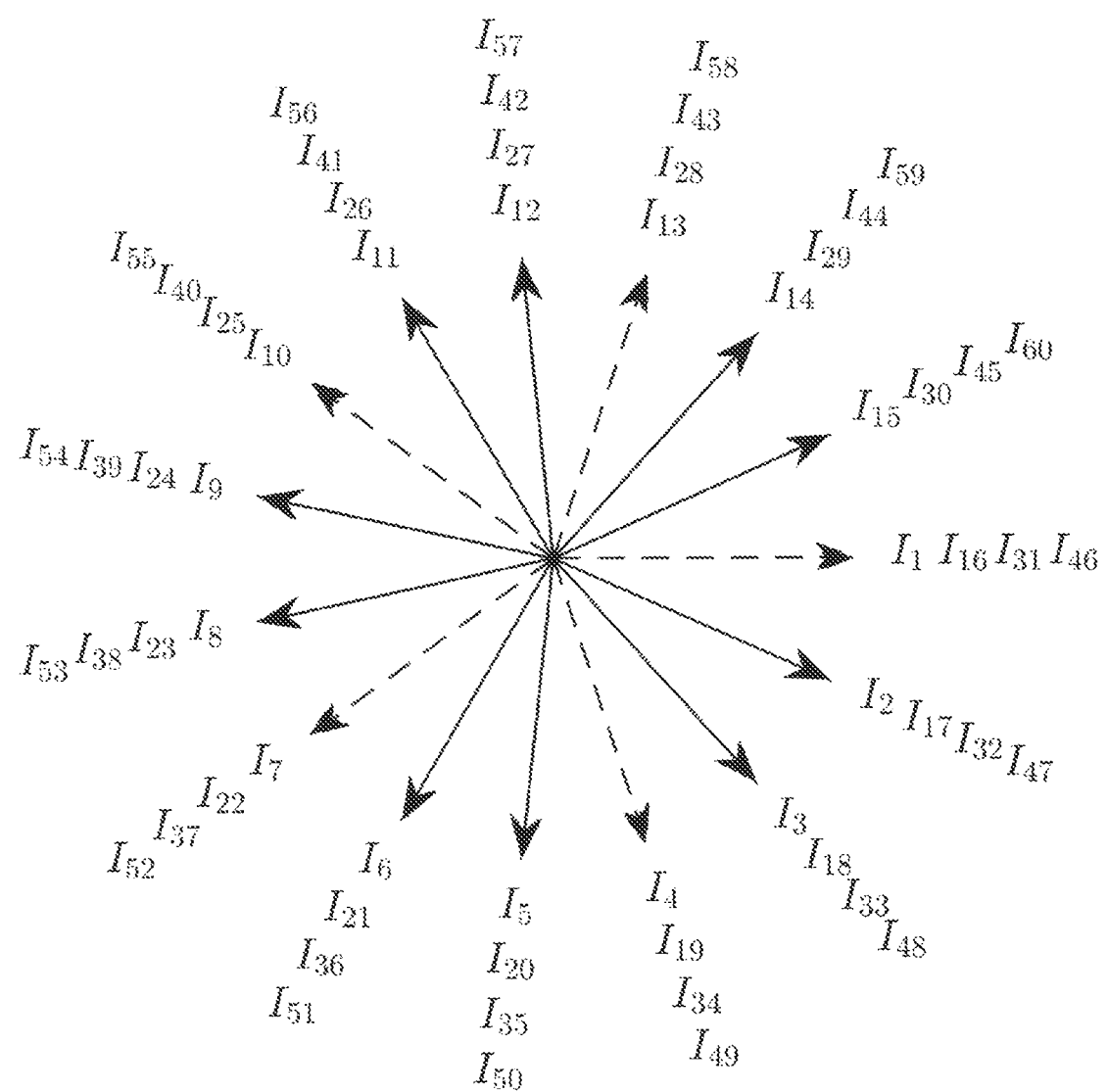

FIGS. 13A and 13B show qualitative current phasors for 15 virtual phases.

Figure 14:
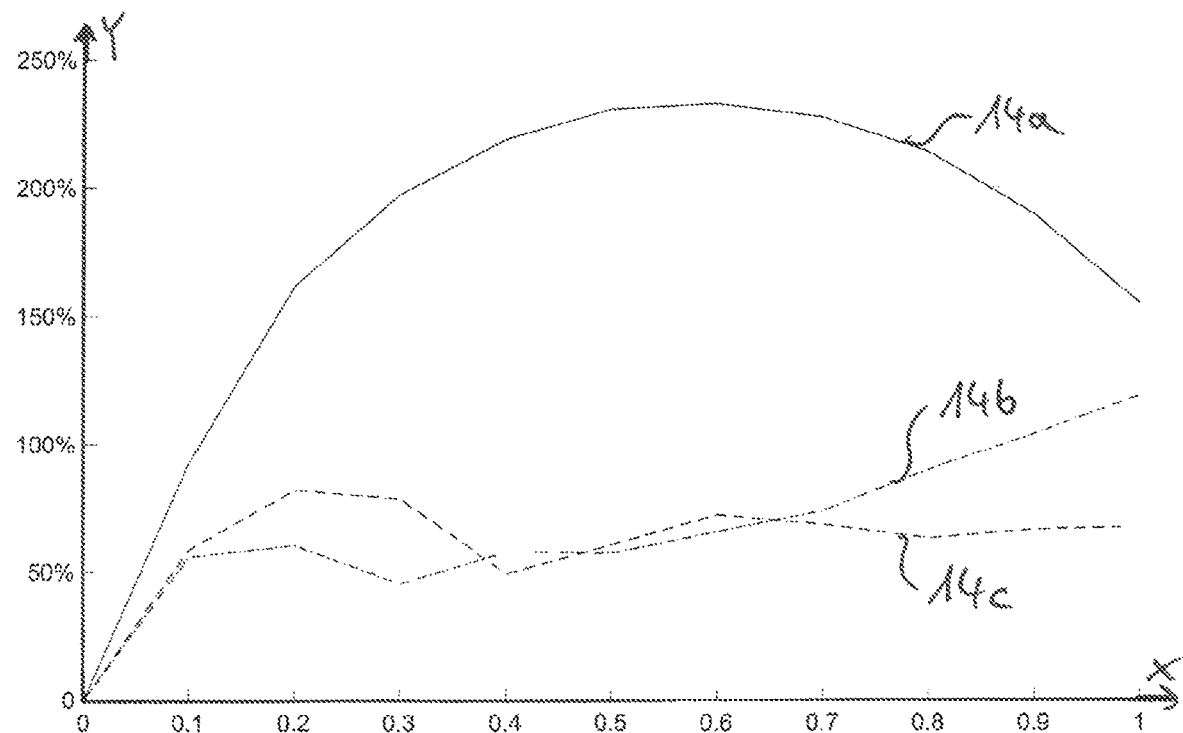

FIG. 14 shows the current at the intermediate circuit capacitor for different groupings of the carrier signals.

Figure 15A:
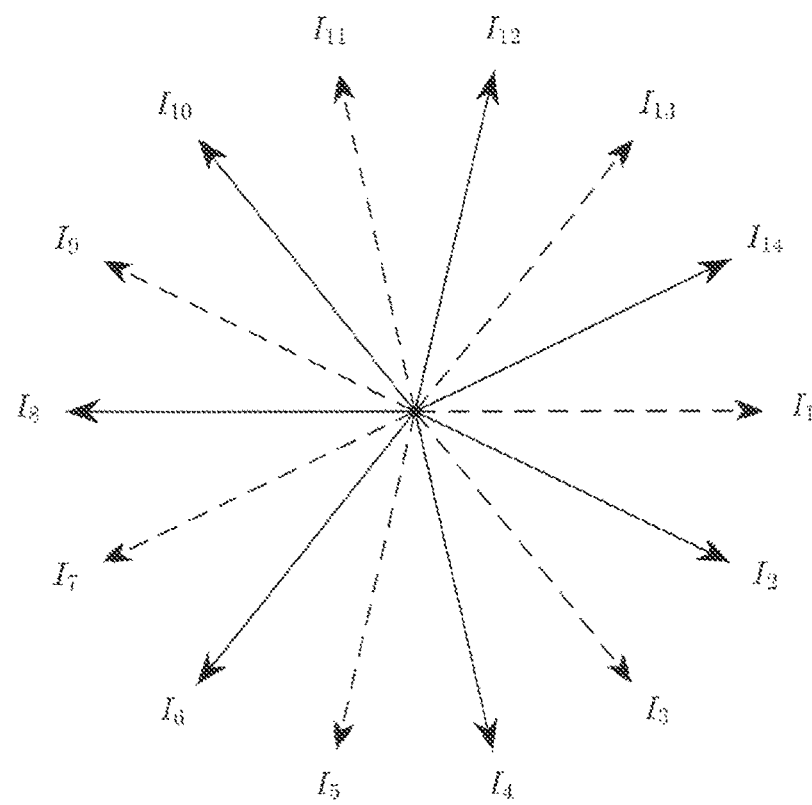
Figure 15B:
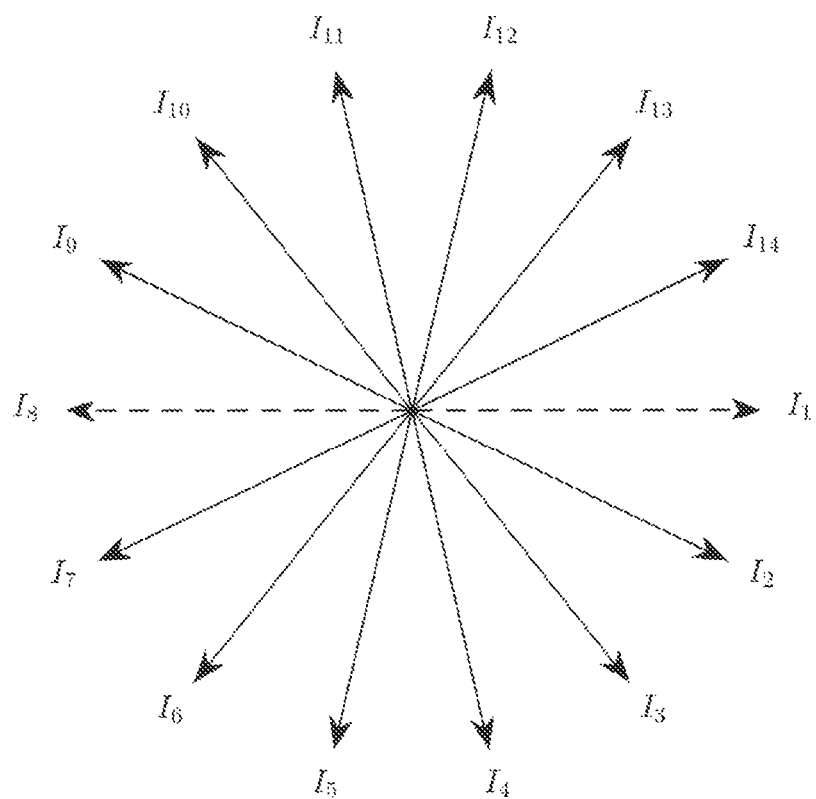

FIGS. 15A and 15B show qualitative current phasors for 14 phases.

Figure 16:
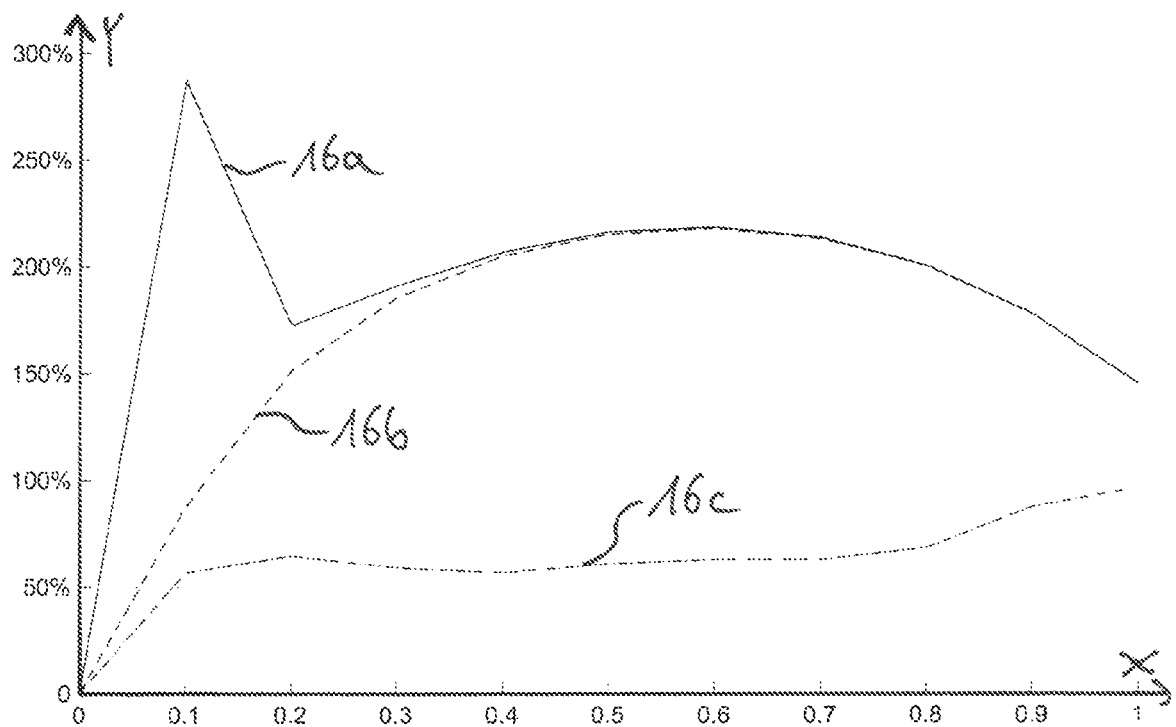
Figure 17:
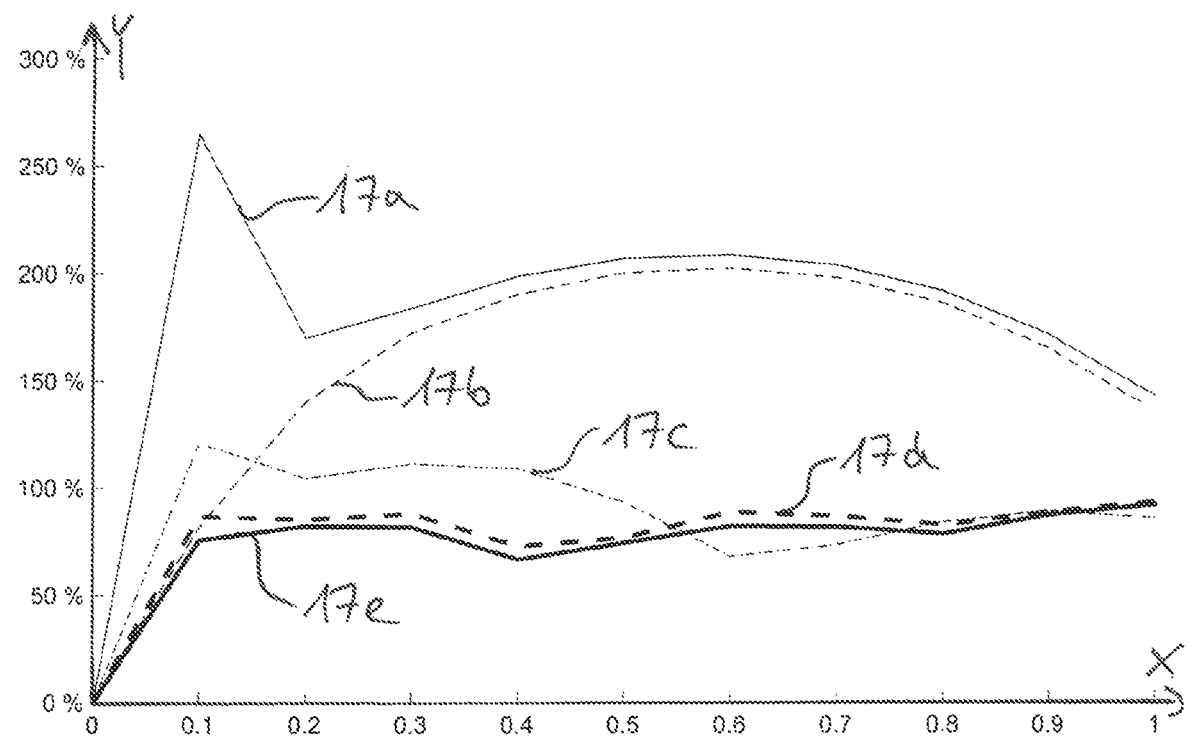

FIGS. 16 and 17 show the current at the intermediate circuit capacitor for different groupings of the carrier signals.

Figure 18:
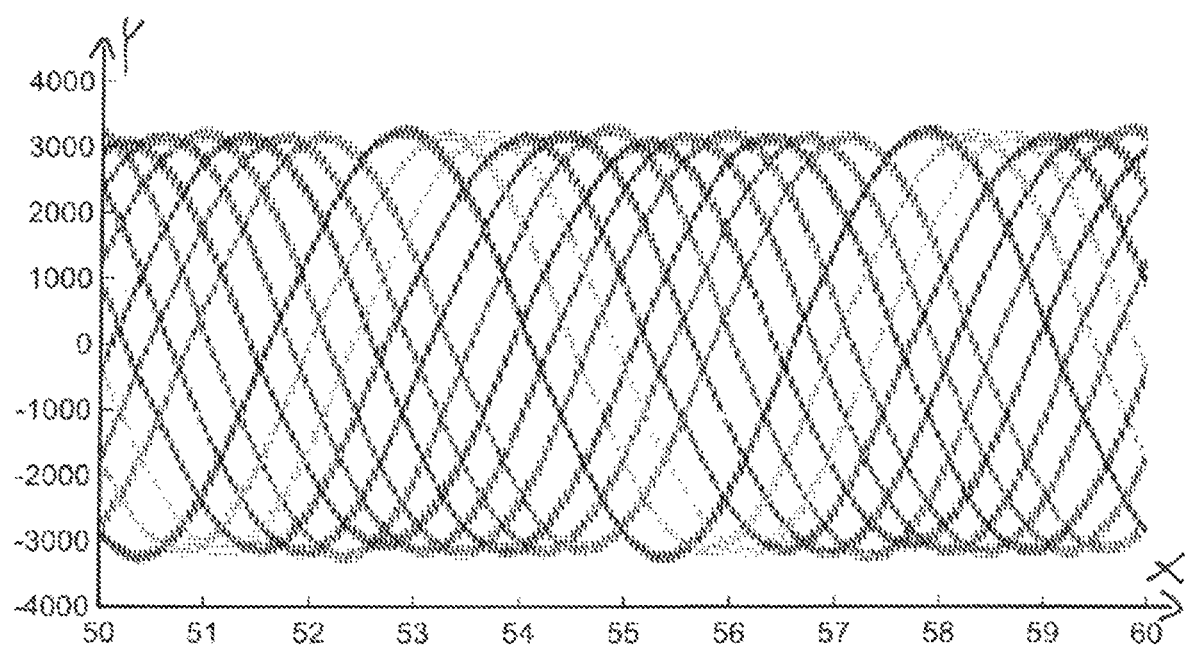

FIG. 18 shows the phase currents for 13 phases.

Figure 19A:
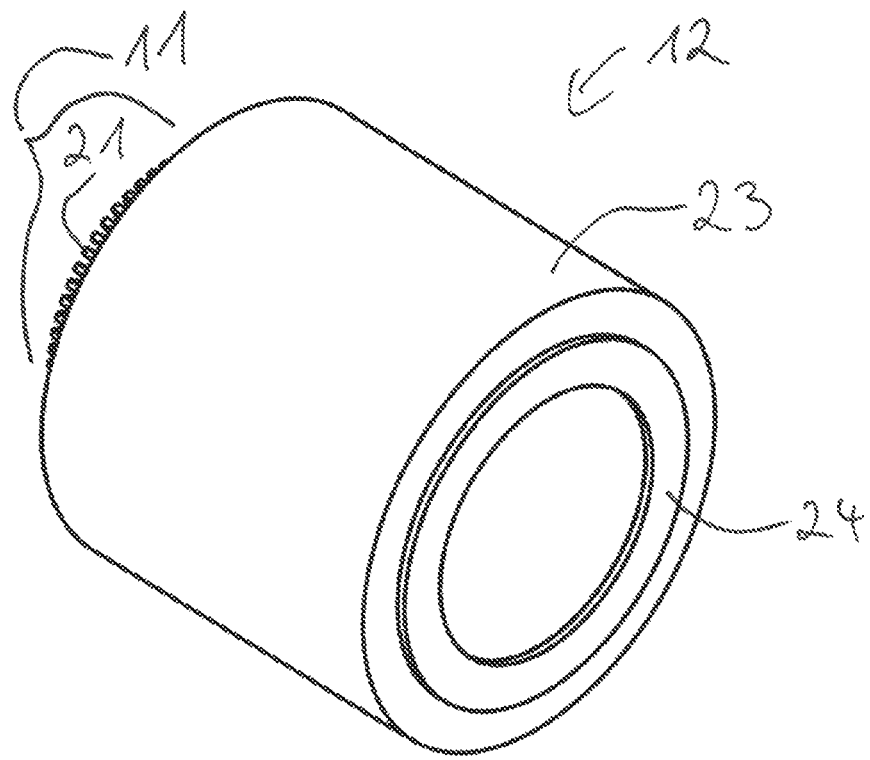
Figure 19B:
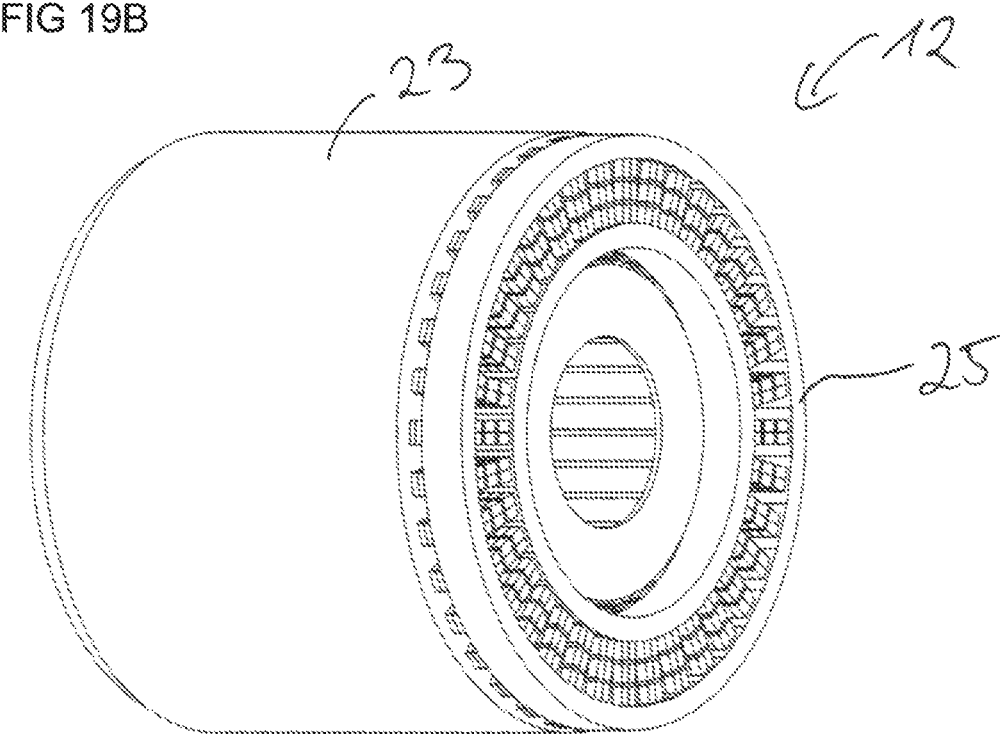

FIGS. 19A and 19B show exemplary embodiments of a stator.

Figure 1A:
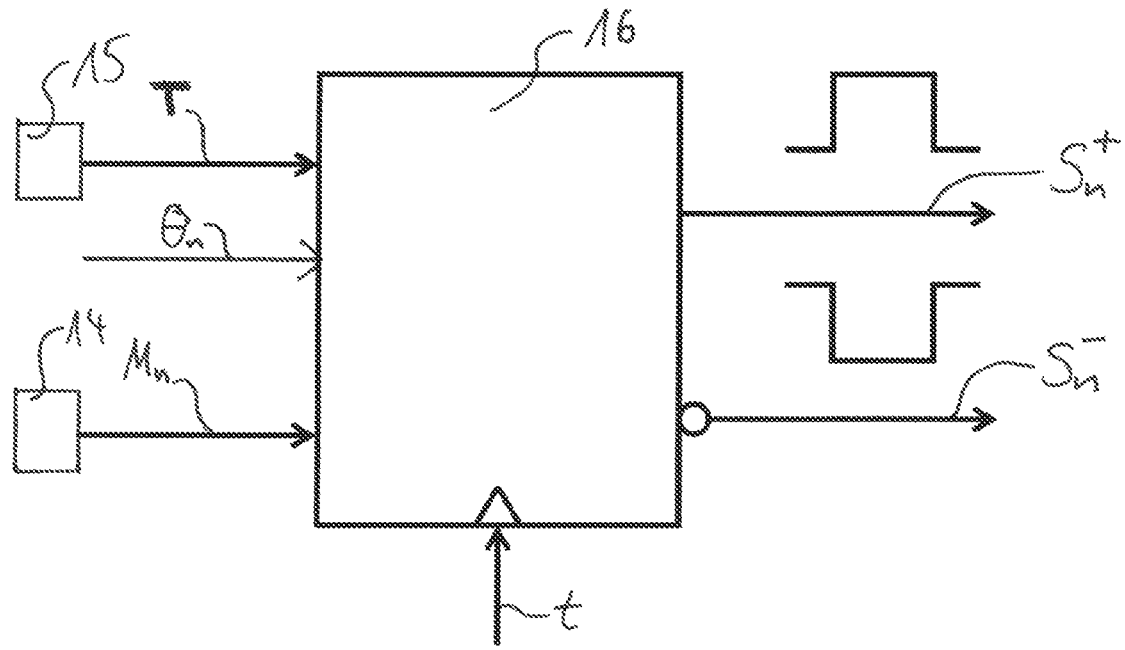
FIGS. 1A and 1B show a part of an exemplary embodiment of the circuit arrangement.

FIG. 1A shows a part of an exemplary embodiment of a circuit arrangement 10 for an electric machine 13. In a carrier signal generator 15, carrier signals T are generated. In a modulation generator 14, modulation signals Mn are generated. The carrier signals T can have the shape of for example a sawtooth or a triangle. The modulation signals Mn can be sinusoidal. In a switching signal generator 16, the carrier signals T and the modulation signals Mn are compared with each other and switching signals Sn+, Sn− are generated, wherein n is a natural number between 1 and N. With the switching signals Sn+, Sn−, phase currents In are generated, with which electrical phases φ of a stator winding 11 are controlled. The carrier signals T have a higher frequency than the modulation signals Mn. By means of the modulation signals Mn the various electrical phases φ of the stator winding 11 are controlled such that they are out of phase relative to one another. As a result, a rotary field is generated in a stator 12 of the electric machine 13. In the switching signal generator 16, the carrier signals T and the modulation signals Mn are compared with one another such that the phase currents In are generated by means of pulse width modulation, for example by sine-triangle comparison. As a result, a duty cycle for the phase currents In is generated in the switching signal generator 16. This takes place on a common time basis t. In order to reduce the maximum currents occurring in the circuit arrangement 10, the electrical phases φ are controlled by carrier signals T that are out of phase relative to one another. The phase shift between the carrier signals T is given by a phase offset θn.

Figure 1B:
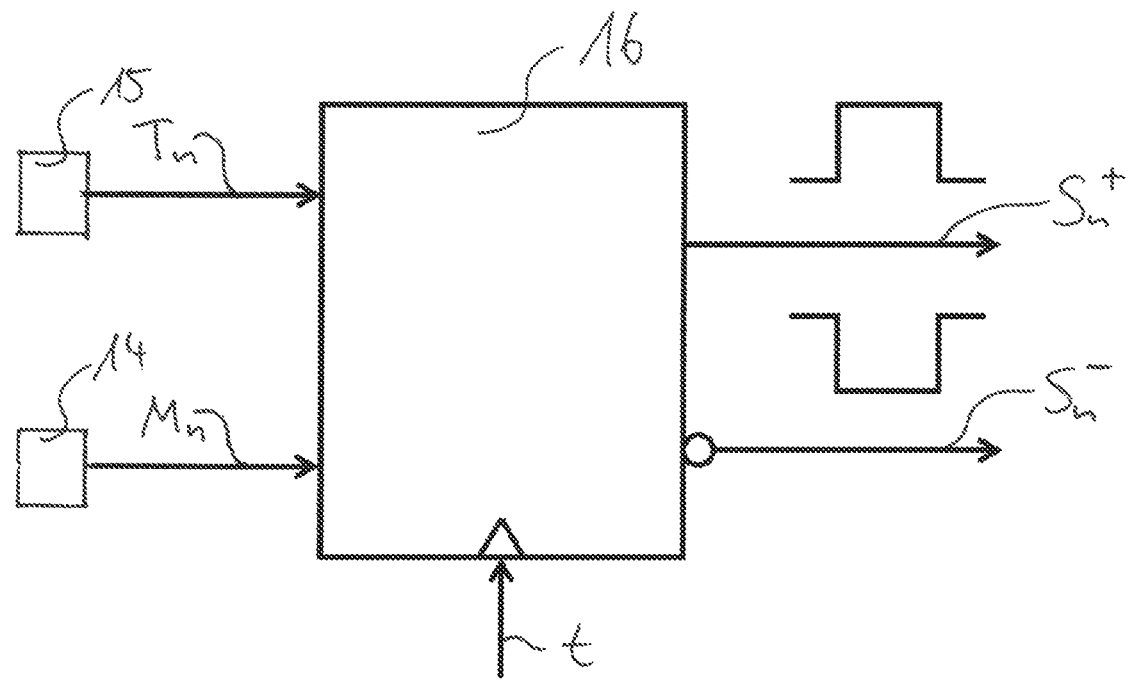

In FIG. 1B, as in FIG. 1A, a part of an exemplary embodiment of the circuit arrangement 10 for an electric machine 13 is shown. In contrast to FIG. 1A, in this case carrier signals Tn that are out of phase with respect to one another are generated in the carrier signal generator 15. This means that the carrier signals Tn are out of phase with respect to one another by an angle θ. In the example in FIG. 1A, a carrier signal T is generated in the carrier signal generator 15, which carrier signal is out of phase by the phase offset θn to control various groups of electrical phases φ.

Figure 2A:
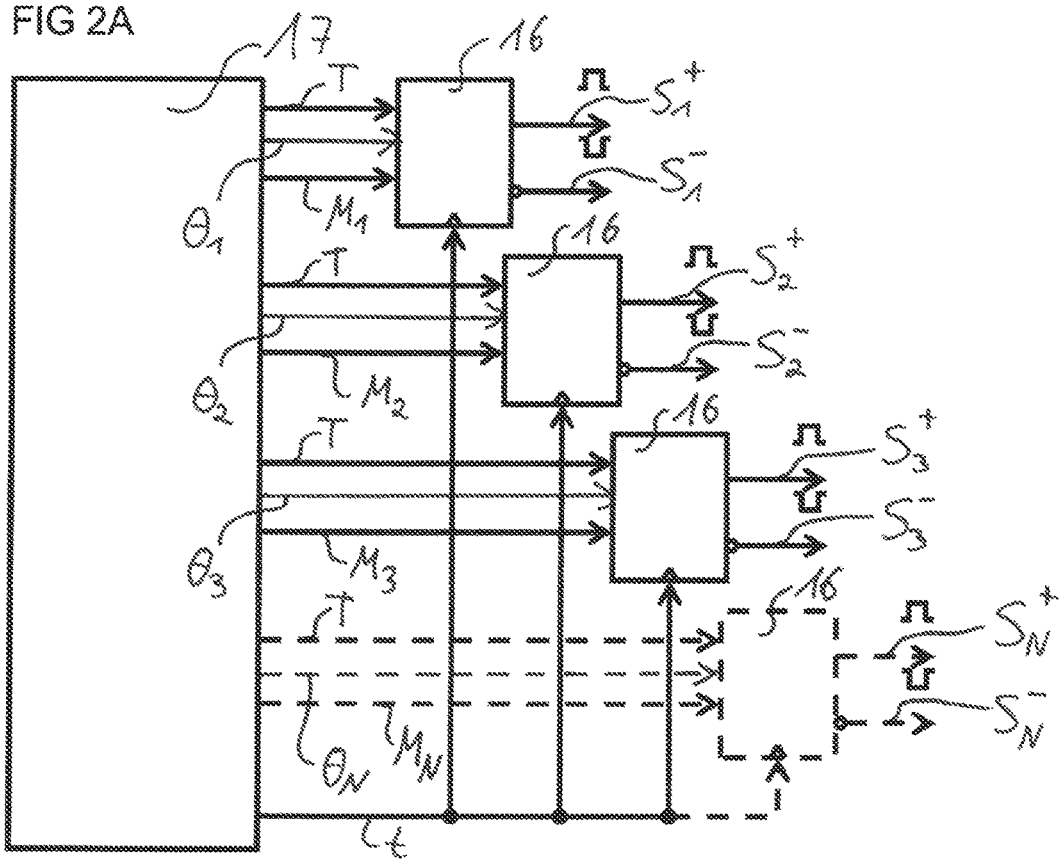
FIGS. 2A and 2B show exemplary embodiments of the circuit arrangement.

FIG. 2A shows a logic circuit 17 with a plurality of switching signal generators 16. If the stator winding 11 has a number N of electrical phases φ, N phase currents I1 to IN are generated in the circuit arrangement 10. To this end, a carrier signal T and the modulation signals M1 to MN are generated in the logic circuit 17. The circuit arrangement 10 in this exemplary embodiment comprises N switching signal generators 16. These generate the switching signals S1+, S1− to SN+, SN−. The logic circuit 17 sets the common time basis t. In addition, the logic circuit 17 sets the phase offset θ1 to θ N between the carrier signals T.

Figure 2B:
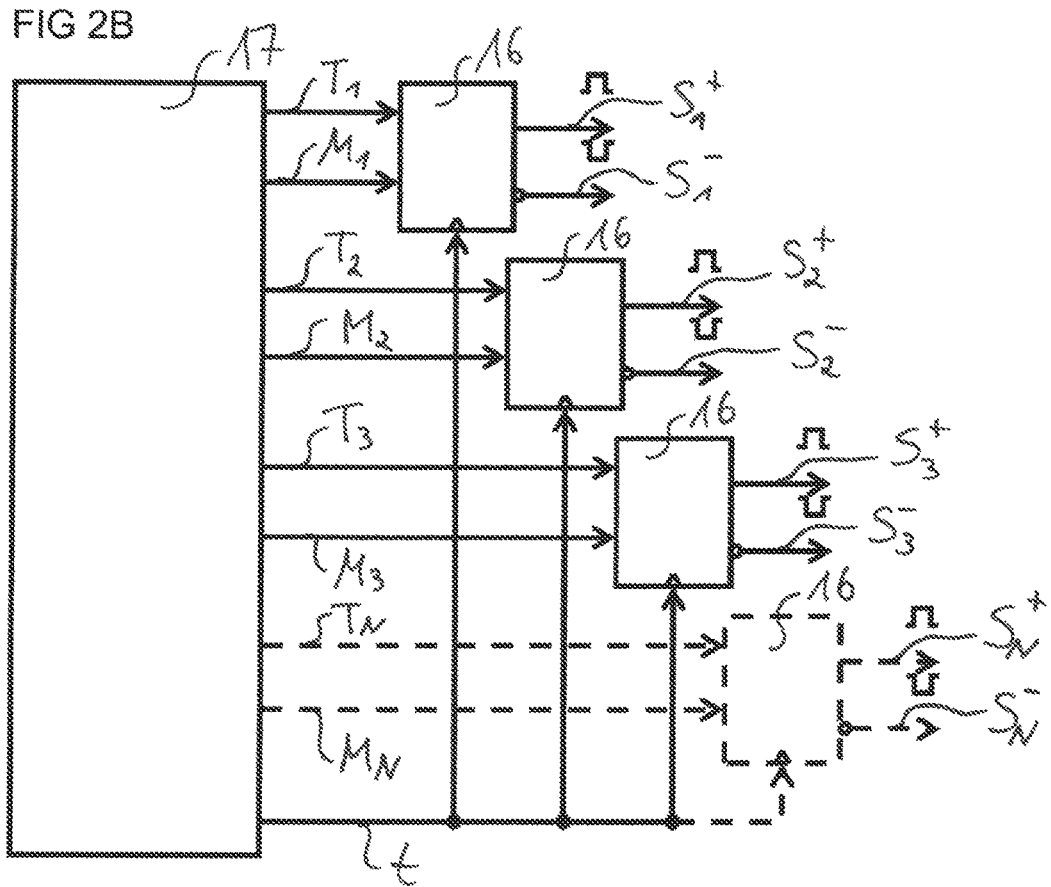

In FIG. 2B, as in FIG. 2A, a logic circuit 17 with a plurality of switching signal generators 16 is shown. In this case carrier signals Tn that are out of phase with respect to one another by a phase offset θ are generated in the logic circuit 17.

Figure 3A:
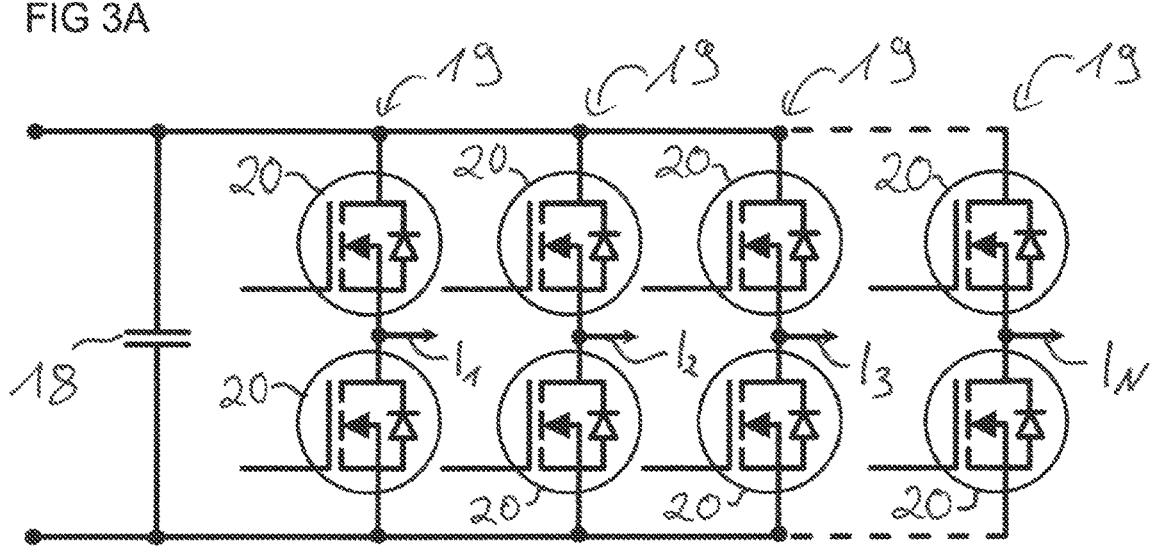
FIGS. 3A and 3B show exemplary half bridges for generating the phase currents.

FIG. 3A shows a plurality of half bridges 19, which are controlled by the switching signal generators 16 of the circuit arrangement 10. With the half bridges 19 the phase currents In are generated. In this exemplary embodiment the DC link with the plurality of half bridges 19 has a central intermediate circuit capacitor 18. Each of the half bridges 19 comprises at least two field effect transistors 20. By means of the phase shift θ between the various carrier signals T, a current IC at the intermediate circuit capacitor 18 is minimized.

Figure 3B:
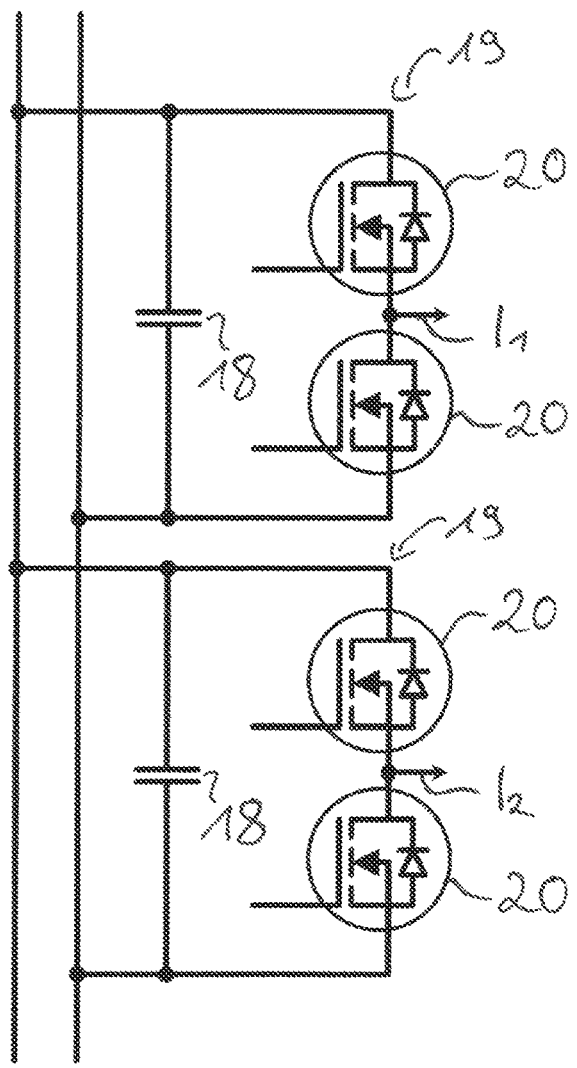

FIG. 3B shows two half bridges 19. In this exemplary embodiment, each of the half bridges 19 is assigned a intermediate circuit capacitor 18. It is also possible that some half bridges 19 each have a intermediate circuit capacitor 18 assigned to them and the other half bridges 19 are assigned a central intermediate circuit capacitor 18.

FIG. 4A shows qualitative current phasors for four electrical phases φ. The electrical phases φ are each supplied with a separate phase current In, the phase currents In in this case each being out of phase by 90 degrees with respect to one another. With the phase currents I1 to I4 illustrated, a rotary field with two poles is generated by the stator winding 11.

FIG. 4B shows four modulation signals M1 to M4 and a carrier signal T. The amplitude is plotted on the y axis over the time t on the x axis. As shown in FIG. 4A, the four modulation signals M1 to M4 are each out of phase by 90 degrees relative to one another. In this exemplary embodiment, the four modulation signals M1 to M4 are assigned a carrier signal T. The carrier signal T has the shape of a triangle. The frequency of the carrier signal T is greater than the frequency of the modulation signals M1 to M4.

FIG. 5A shows four qualitative current phasors for four electrical phases φ. Four different phase currents I1 to I4 are therefore generated, which are out of phase with respect to one another by 90 degrees in each case. In this case the currents I1 and I3 are assigned a carrier signal T1 and the phase currents I2 and I4 a carrier signal T2. The broken line therefore indicates the assignment of the carrier signal T1 and the solid line indicates the assignment of the carrier signal T2.

FIG. 5B shows four modulation signals M1 to M4 and two carrier signals T1 and T2. The amplitude is plotted on the y axis over the time t on the x axis. The four modulation signals M1 to M4 are out of phase with respect to one another by 90 degrees in each case. The modulation signals M1 and M3 are assigned the carrier signal T1, which is indicated by a broken line. The modulation signals M2 and M4 are assigned the carrier signal T2, which is indicated by a solid line. The two carrier signals T1 and T2 are out of phase with respect to one another by 180 degrees.

FIG. 6A shows qualitative current phasors for 60 electrical phases φ. For example, the stator winding 11 in the stator 12 can be formed by electrically conductive bars 21 in slots 22. In this exemplary embodiment, the stator winding 11 comprises 60 electrically conductive bars 21. The electrically conductive bars 21 are each supplied with a separate phase current I1 to I60. The electrical phases φ have a phase shift of 6 degrees relative to one another. The stator winding 11 therefore generates a rotary field with two magnetic poles.

FIG. 6B shows qualitative current phasors for 60 electrical phases φ. In this example, the electrical phases φ are out of phase with respect to one another by 24 degrees in each case. Thus, a rotary field with eight poles is generated in the stator winding 11. This means that in each case four phase currents In are equal in amplitude and phase shift. For example, the currents I1, I16, I31 and I46 have the same amplitude and the same phase shift.

FIG. 7 shows an analytical calculation of the current at the intermediate circuit capacitor 18 for four different numbers N of electrical phases φ. The current IC at the intermediate circuit capacitor 18 can be assumed to be the AC component of the superimposed phase currents In. The current IC at the intermediate circuit capacitor 18 normalized to the battery current is plotted on the y axis. The modulation index is plotted on the x axis. The current IC at the intermediate circuit capacitor 18 is shown for stator windings 11 with different numbers N of electrical phases φ. For a number of electrical phases φ of N=3, the current IC at the intermediate circuit capacitor 18 is highest. From a number N of 15 electrical phases φ of the stator winding 11 the current IC at the intermediate circuit capacitor 18 decreases only slightly with an increasing number N of electrical phases φ.

FIG. 8 shows an analytical calculation of the current at the intermediate circuit capacitor 18 for three different numbers N of electrical phases φ. The current IC at the intermediate circuit capacitor 18 in kiloampere is plotted on the y axis. The modulation index is plotted on the x axis. The current IC at the intermediate circuit capacitor 18 is at its maximum for a number N of 15 electrical phases φ. In this case a DC link voltage of only 24 volts is specified and therefore very high battery currents occur and thus also very high currents at the intermediate circuit capacitor 18.

FIG. 9 shows a numerical calculation of the current IC at the intermediate circuit capacitor 18. The current IC was calculated for a converter with 15 electrical phases φ. In this case the phase currents In are generated by pulse width modulation by sine-triangle comparison. The current IC at the intermediate circuit capacitor 18 normalized to one is plotted on the y axis. The time in milliseconds is plotted on the x axis. Overall, the analytical calculations show deviations of less than three percent relative to the numerical simulation.

FIG. 10 illustrates 15 modulation signals M and one carrier signal T. In this case, therefore, the same carrier signal T is used in the pulse width modulation for all the electrical phases φ. Numerical simulations of a triangular carrier signal T and of a plurality of sinusoidal modulation signals M are shown in FIG. 10. The amplitude is plotted on the y axis and the time in milliseconds is plotted on the x axis. The frequency of the carrier signal T is much higher than the frequencies of the modulation signals M and therefore the modulation signals M show only a slight change in amplitude in the period of time illustrated. During the pulse width modulation a switching signal Sn+ for generating a phase current In is generated by a half bridge 19 in each case as a logical 1 if the amplitude of the modulation signal M is greater than the amplitude of the carrier signal T. Otherwise the switching signal Sn+ is generated as a logical 0. In addition, a switching signal Sn− for generating a phase current In is generated as a logical 1 if the amplitude of the modulation signal M is less than or equal to the amplitude of the carrier signal T and otherwise the switching signal Sn− is generated as a logical 0. FIG. 10 shows that at some points in time, for example in the regions circled, the phase currents In of all 15 electrical phases φ contribute to the RMS value of the current IC at the intermediate circuit capacitor 18. At the times marked in the negative region of the y axis, therefore, the amplitude of the signals M for all 15 electrical phases φ is greater than the amplitude of the carrier signal T. This means that the superimposed current IC at the intermediate circuit capacitor 18 reaches its maximum at these times.

FIG. 11 shows 15 carrier signals T1 to T15 that are shifted relative to one another. The amplitude is plotted on the y axis and the time t in milliseconds is plotted on the x axis. The 15 carrier signals T each have a phase shift of 24 degrees relative to one another. The modulation index is 50% and the power factor is 0.95. If in a stator winding 11 with 15 electrical phases φ a carrier signal T is assigned to each electrical phase φ, the numerical simulations give an increase in the current at the intermediate circuit capacitor 18.

FIG. 12 shows the current IC at the intermediate circuit capacitor 18 for various phase shifts θ between the carrier signals T. The current IC at the intermediate circuit capacitor 18 normalized to the phase current In is plotted on the y axis. The phase shift θ between the carrier signals T is plotted on the x axis. This means that, if the phase currents In are generated with only one carrier signal T, and therefore there is a phase shift of 0 between the carrier signals T, the current IC at the intermediate circuit capacitor 18 is 266% of the phase current In. If multiple carrier signals T are provided for generating the phase currents In and these are out of phase with respect to one another by for example 24 degrees, the current IC at the intermediate circuit capacitor 18 is significantly increased compared to the generation of the phase currents In with only one carrier signal T. However, it is also shown that the current IC at the intermediate circuit capacitor 18 can be significantly reduced for other phase shifts θ between the carrier signals T. For example, the current IC at the intermediate circuit capacitor 18 in the case of a phase shift of θ=72° is only 54% of the phase current In.

FIG. 13A shows qualitative current phasors for 60 electrical phases φ. Each of the electrical phases φ is assigned a phase current In. The electrical phases φ are each out of phase with respect to one another by 24 degrees. Four phase currents In therefore have the same amplitude and the same phase in each case. This means that a virtual number of phases V is defined, which in this case is 15. The virtual number of phases V is given by:

$$V = \frac{N}{p}, \quad (2)$$

wherein p denotes the number of magnetic pole pairs of the stator.

For the control of the electrical phases φ by different carrier signals T, the electrical phases φ are divided into groups. In this example the electrical phases φ are divided into five groups of three. One of the groups of three is formed by the broken arrows. This means that the electrical phases φ within a group are each out of phase with respect to one another by the same angle. In this case the three electrical phases φ of one group are shifted relative to one another by 120 degrees in each case. This means that five carrier signals T are provided in this exemplary embodiment, each of which is assigned to a group of electrical phases φ. Since there are a total of five carrier signals T, these are out of phase with respect to one another by:

$$\theta = \frac{360°}{5} = 72°$$

As shown in FIG. 12, the current IC at the intermediate circuit capacitor 18 for this type of control is reduced compared to a control using only one carrier signal T.

In FIG. 13B, as in FIG. 13A, qualitative current phasors for 60 electrical phases φ are illustrated. In this exemplary embodiment the 15 virtual phases are divided into three groups of five, which means that three carrier signals T are provided. One of the groups of five is highlighted by broken arrows. Since only three carrier signals T are provided, these are out of phase with respect to one another by:

$$\theta = \frac{360°}{3} = 120°$$

With this type of control too, the current IC at the intermediate circuit capacitor 18 is reduced compared to a control using only one carrier signal T.

FIG. 14 illustrates the current IC at the intermediate circuit capacitor 18 for different numbers of carrier signals T. The current IC at the intermediate circuit capacitor 18 normalized to the phase current In is shown on the y axis. The modulation index is plotted on the x axis. The power factor is 0.8. The curve 14a represents the current IC at the intermediate circuit capacitor 18 for a generation of the phase currents In with only one carrier signal T. As shown above, higher currents than the phase currents In occur at the intermediate circuit capacitor 18 as a result of the superposition of the phase currents In. The curve 14b shows the current IC at the intermediate circuit capacitor 18 for the case illustrated in FIG. 13A. Five carrier signals T are provided, which are out of phase with respect to one another by 72 degrees. The 15 virtual phases are divided into five groups of three. Curve 14c shows the current $I_C$ at the intermediate circuit capacitor 18 for the arrangement in FIG. 13B. This means that three carrier signals T are provided and the 15 virtual phases are divided into three groups of five. By generating the phase currents $I_n$ using multiple carrier signals T, therefore, the current $I_C$ at the intermediate circuit capacitor 18 can be reduced. Depending on the modulation index, where there are 15 virtual phases it is more advantageous to divide the phases into three groups of five or into five groups of three.

FIG. 15A illustrates qualitative current phasors for 14 electrical phases φ. The 14 electrical phases φ are each out of phase with respect to one another by about 26 degrees. For control using multiple carrier signals T, the 14 electrical phases φ can be divided for example into two groups of seven. One of the groups of seven is illustrated in FIG. 15A by broken lines.

FIG. 15B illustrates qualitative current phasors for 14 electrical phases φ. Where there are 14 electrical phases φ it is likewise possible to divide the phases into seven groups of two. One of these groups of two is illustrated by broken lines in FIG. 15B.

In FIG. 16 the current IC at the intermediate circuit capacitor 18 is illustrated for different numbers of carrier signals T. The current IC at the intermediate circuit capacitor 18 normalized to the phase current In is plotted on the y axis. The modulation index is plotted on the x axis. The power factor is 0.8. Curve 16a shows the current IC at the intermediate circuit capacitor 18 for the case illustrated in FIG. 15A. The 14 electrical phases of the electrical winding 11 are divided into two groups of seven. This means that two carrier signals T are provided, which are out of phase with respect to one another by 180 degrees. The curve 16b shows the current IC at the intermediate circuit capacitor 18 for the case in which the phase currents In are generated with only one carrier signal T. The curve 16c shows the current IC at the intermediate circuit capacitor 18 for the case shown in FIG. 15B. In this case the 14 electrical phases φ are divided into seven groups of two. The seven carrier signals T are out of phase with respect to one another by about 51 degrees. The generation of the phase currents In by two carrier signals T, as shown in curve 16a, does therefore not contribute to reducing the current at the intermediate circuit capacitor 18. However, for the generation of the phase currents In using seven carrier signals T a reduction of the current at the intermediate circuit capacitor 18 is shown.

FIG. 17 shows the current IC at the intermediate circuit capacitor 18 for various numbers of carrier signals T. The current IC at the intermediate circuit capacitor 18 normalized to the phase current In is plotted on the y axis. The modulation index is plotted on the x axis. The power factor is 0.8. In this exemplary embodiment, the stator winding 11 comprises thirteen electrical phases φ. This means, the number N of electrical phases φ is a prime number. The electrical phases φ cannot therefore be divided into groups with an equal number N of electrical phases φ. In this exemplary embodiment, therefore, the electrical phases φ are divided into groups with different numbers N of electrical phases φ.

Curve 17a shows the current IC at the intermediate circuit capacitor 18 for a group with six electrical phases and a group with seven electrical phases. This means that two carrier signals T are provided in this case. Curve 17b shows the current IC at the intermediate circuit capacitor 18 for a generation of the phase currents In with only one carrier signal T. The curve 17c shows the current IC at the intermediate circuit capacitor 18, wherein the electrical phases φ are divided into three groups of three and one group of four. This means that four carrier signals T are provided in this case. The curve 17d shows the current IC at the intermediate circuit capacitor 18 for a division of the electrical phases φ into five groups of two and one group of three. The curve 17e shows the current IC at the intermediate circuit capacitor 18 for a division of the electrical phases φ into two groups of four and one group of five. Overall, the exemplary embodiments of curves 17c, 17d and 17e are advantageous compared to the generation of the phase currents In with only one carrier signal T. Thus, it is also possible to achieve a reduction of the current at the intermediate circuit capacitor 18 for stator windings 11 of which the number N of electrical phases φ is a prime number.

FIG. 18 shows the phase currents In of the thirteen electrical phases φ. The phase currents In in ampere are plotted on the y axis and the time t in milliseconds is plotted on the x axis. Since the number N of electrical phases φ is a prime number in this case, the electrical phases φ are divided into groups with different numbers N of electrical phases φ. This leads to the phase currents In running asymmetrically. In the example shown, however, the deviations from symmetrical running are small. Asymmetrical running of the phase currents In can be compensated for example by current control.

FIG. 19A shows an exemplary embodiment of a stator 12 of an electric machine 13. The stator 12 comprises a laminated stator core 23, into which slots 22 are formed. An electrically conductive bar 21 is located in each slot 22. The bars 21 are electrically connected to one another on a first side of the stator 12 via a short-circuit ring 24 and form an electrical winding 11 of the stator 12. On a second side of the stator 12 the bars 21 are free from a short-circuit ring 24. A rotor of the electric machine 13 can be arranged in the stator 12.

FIG. 19B shows an exemplary embodiment of a stator 12, which is connected to a power supply unit 25 of the power electronics. The bars 21 in the slots 22 can be supplied separately by the power supply unit 25.

LIST OF REFERENCE SIGNS

10: Circuit arrangement
11: Stator winding
12: Stator
13: Electric machine
14: Modulation generator
15: Carrier signal generator
16: Switching signal generator
17: Logic circuit
18: intermediate circuit capacitor
19: Half bridge
20: Field effect transistor
21: Bar
22: Slots
23: Laminated stator core
24: Short-circuit ring
25: Power supply unit
$I_C$: Current
$I_n$: Phase current
M: Modulation signal
N: Number of electrical phases
$S_n^+$: Switching signal
$S_n^-$: Switching signal
T: Carrier signal
t: Time
V: Virtual number of phases
φ: Electrical phase
θ: Phase shift of carrier signals

The invention claimed is:

1. A circuit arrangement for controlling a stator winding of a stator of an electric machine, wherein:
   the stator winding has at least four electrical phases, which are designed to be supplied with a separate phase current, respectively,
   a modulation signal is assigned to each electrical phase and the modulation signals are out of phase with respect to one another so that the stator winding is designed to generate a rotary field,
   at least two carrier signals are provided for generating the phase currents, the electrical phases are divided into at least two groups, each of which is assigned a carrier signal, and the carrier signals have a phase shift relative to one another.

2. The circuit arrangement for controlling a stator winding of a stator of an electric machine according to claim 1, wherein the modulation signals are shifted relative to one another by $$\frac{360}{N} * p$$

degrees and N denotes the number of electrical phases and p is a natural number.

3. The circuit arrangement for controlling a stator winding of a stator of an electric machine according to claim 1, wherein the frequency of one of the carrier signals is greater than the frequency of the respective modulation signal.

4. The circuit arrangement for controlling a stator winding of a stator of an electric machine according to claim 1, wherein the respective phase currents are generated by pulse width modulation.

5. The circuit arrangement for controlling a stator winding of a stator of an electric machine according to claim 1, wherein during operation of the circuit arrangement no voltage occurs which is greater than 60 V.

6. The circuit arrangement for controlling a stator winding of a stator of an electric machine according to claim 1, wherein the circuit arrangement is designed to be used in hybrid or battery electric vehicles.

7. The circuit arrangement for controlling a stator winding of a stator of an electric machine according to claim 1, wherein the stator winding is formed by at least four electrically conductive bars, which are each located in a slot in the stator, and wherein each bar forms an electrical phase.

8. The circuit arrangement for controlling a stator winding of a stator of an electric machine according to claim 1, wherein the at least two groups of the electrical phases each comprise the same number of electrical phases.

9. The circuit arrangement for controlling a stator winding of a stator of an electric machine according to claim 1, wherein the at least two groups of the electrical phases each comprise different numbers of electrical phases.

10. An electric machine, comprising:
- a stator, which comprises at least four slots, in each of which an electrically conductive bar is located, wherein the bars form a stator winding, and each of the bars forms an electrical phase and is designed to be supplied with a separate phase current in each case,
- a modulation generator, which is designed to generate a modulation signal for each electrical phase, wherein the modulation signals are out of phase with respect to one another so that the stator winding is designed to generate a rotary field,
- a carrier signal generator, which is designed to provide at least two carrier signals for generating the phase currents, wherein:
- the electrical phases are divided into at least two groups, each of which is assigned a carrier signal, and
- the carrier signals have a phase shift relative to one another.

* * * * *